United States Patent Office 3,714,391
Patented Jan. 30, 1973

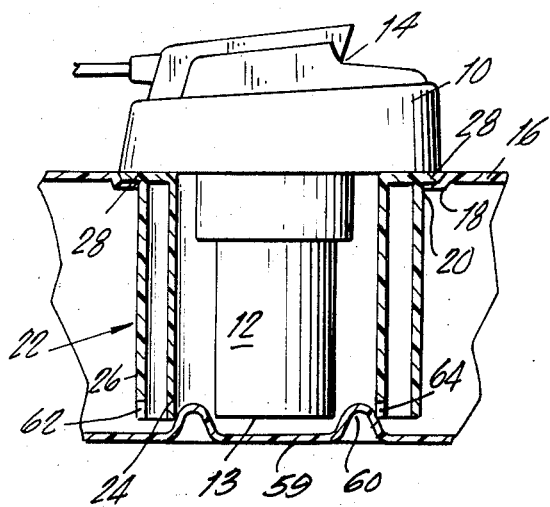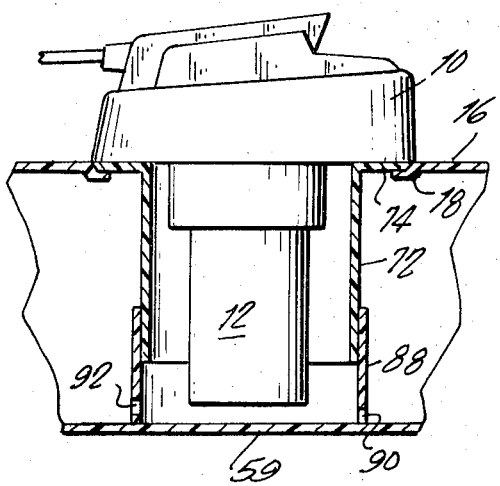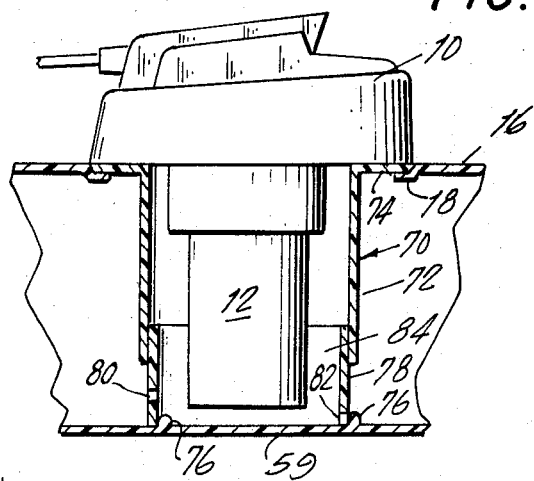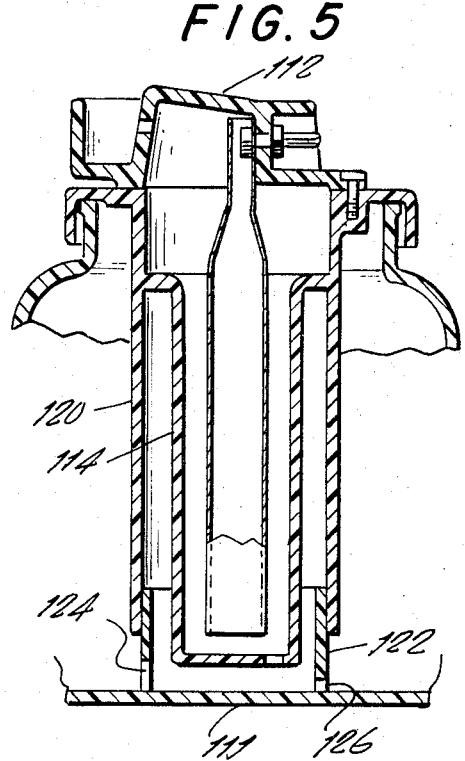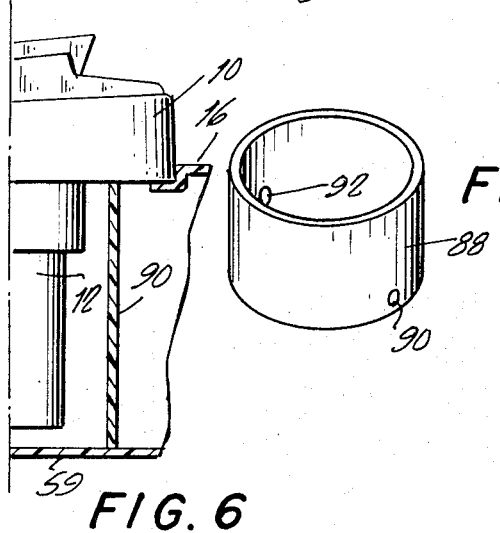

3,714,391
VAPORIZER WITH THERMALLY ISOLATED HEATING CHAMBER
Lawrence Katzman, New York, and Edward Briggin, Brooklyn, N.Y., assignors to Kaz Manufacturing Co., Inc., New York, N.Y.
Continuation-in-part of applications Ser. No. 884,911, Dec. 15, 1969, now Patent No. 3,610,879, and Ser. No. 113,543, Feb. 8, 1971. This application Sept. 28, 1971, Ser. No. 184,441
Int. Cl. A61m *15/00;* H05b *3/60*
U.S. Cl. 219—271      5 Claims

ABSTRACT OF THE DISCLOSURE

A heat insulating construction for a vaporizer comprising a vaporizer bowl having its bottom provided with at least one upstanding rib and a vaporizer head including a cap having a heating chamber depending therefrom and extending into the bowl and having a steam outlet in communication with the heating chamber. The heating chamber has an opening therein for receiving liquid from the vaporizer bowl. The vaporizer bowl has an opening for receiving the heating chamber. A cylindrical wall surrounds the heating chamber in non-contacting spaced relationship thereto and extends from the cap to engagement with the rib on the bottom of the bowl for lowering the temperature of the water in the bowl externally of the wall to substantially human body temperature in one embodiment, the wall has an integral horizontal flange at its upper edge and a second wall integral with the bottom and spaced inwardly of the first mentioned wall extends upwardly thereof.

---

This invention relates to electric steam vaporizers for therapeutic use, and more particularly to heat insulating construction therefor. This application is a continuation in part and is co-pending with United States application Ser. No. 884,911, filed Dec. 15, 1969, for "Insulated Heating Chamber for Vaporizers," now Pat. No. 3,610,879, and is a continuation-in-part and co-pending with United States application Ser. No. 113,543 filed Feb. 8, 1971 for "Vaporizer Bowl Construction."

In the past, electric steam vaporizers have been produced which employ a pair of spaced electrodes mounted in a heating chamber for converting water into steam. The heating chamber is for the purpose of substantially instantaneously heating the water to change the water into steam and is arranged so that the water in the main container of the vaporizer bowl can flow into the heating chamber to maintain the level of the heating chamber as the steam is produced. Such a heating chamber is disclosed in U.S. Pat. No. 3,319,046.

One of the main drawbacks of this arrangement is that the heating chamber is surrounded by the water in the bowl which surrounding water is thereby heated through heat transfer from the heating chamber and thus the temperature of the water in the bowl can rise to an unsatisfactory extent. In conventional electric steam vaporizers the prolonged use thereof for periods up to twenty-four hours will cause the water exterior of the heating chamber often to become heated to 140° F. or even as high as 145° F. Various types of complicated attachments and insulated heating chamber constructions have been utilized in the past, such as is shown in U.S. Pat. No. 3,518,409, but because of the conduction between the several parts of the insulated heating chambers, temperatures have been reduced only a few degrees as, for example, to a temperature in the order of 125° F. However, because the present invention employs a wall surrounding the heating chamber and wall spaced therefrom with means for restricting fluid flow from the heating chamber and water surrounding the heating chamber to the space in the bowl exterior of the wall, a surprisingly and unexpectedly great reduction of the highest temperature occurring has been made to the extent that the highest temperature of the water exterior of the insulating chamber will be in the order of human body temperature and in the order of 35° C.

It is, therefore, the primary object of the present invention to provide a heat insulating construction which will result in the operating temperature of the water exterior of the heating chamber being reduced to safe limits in the order of approximately 35° C.

It is a further object of the invention to provide an insulating heating chamber which is simple in construction, which can be manufactured out of readily available synthetic plastic materials compatible with the materials conventionally used in vaporizers and which permits for easy access to facilitate washing and scouring thereof.

Still further objects and features of this invention reside in the provision of a heat insulating construction that will insure safe operation of the electric steam vaporizer and which will eliminate the use of any barrier or buffer necessary between the vaporizer and any article of furniture on which it is placed, which is durable, and which is simple to manufacture by mass production methods.

In summary, the invention employs the concept of a vaporizer bowl having its bottom provided with at least on upstanding rib which functions in combination with a wall surrounding the heating chamber in non-contact spaced relation thereto. The wall engages the rib and extends from the bottom of the vaporizer bowl to the cap to divide the vaporizer bowl into an exterior portion and an interior portion.

These, together with the various ancillary objects and features of the present invention, which will become apparent as the following description proceeds, are attained by this heat insulating construction, preferred embodiments of which are illustrated in the accompanying drawing, by way of example only, wherein:

FIG. 1 is a verical sectional view illustrating details of construction of an embodiment of the invention;

FIG. 2 is a vertical sectional detail view illustrating a modified form of the invention;

FIG. 3 is a view similar to FIG. 2, but showing another form of the invention;

FIG. 4 is a perspective view of one of the components such as shown in FIG. 3;

FIG. 5 is a vertical sectional detail view illustrating an additional form of the invention;

FIG. 6 is a vertical sectional view of another embodiment of the invention;

Figure 7:
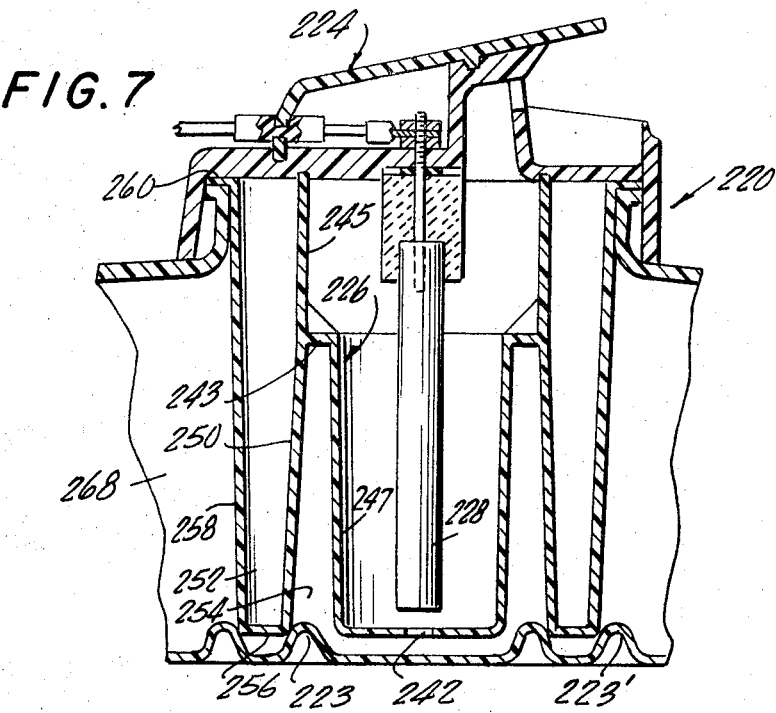
FIG. 7 is a vertical sectional view of another concept in heat insulating construction for vaporizers.

With continuing reference to the accompanying drawing, wherein like reference numerals designate similar parts throughout the various views and with initial attention to the embodiment shown in FIG. 1, reference numeral 10 generally designates a vaporizer head of the type disclosed in the aforementioned U.S. Pat. No. 3,319,046, which includes a cap having a heating chamber 12 depending therefrom and a steam outlet 14. The bottom 13 of the heating chamber 12 preferably has one or more openings therein through which water can enter the heating chamber 12.

The vaporizer head 10 is inserted into the container 16 of the vaporizer bowl. The container 16 has a peripheral flange 18 which may be offset downwardly and by its peripheral edge 20 defines an opening into which the heating chamber 12 is inserted.

An insulating chamber 22 surrounds the heating chamber 12 and has its inner wall 24 spaced therefrom. The inner wall 24 is preferably cylindrical in shape and spaced from the inner wall 24 is an outer wall 26. Integral with the outer wall 26 is a substantially horizontally extending portion 28 forming a flange which overlies the flange 18. The flange 28 integrally interconnects at the tops thereof the inner wall 24 and the outer wall 26.

The bottom 59 of the container has a circular rib 60 against which the inner wall 24 can bear so as to align the insulating chamber 22 when it is inserted. In order to permit fluid to pass into the space between the inner wall 24 and the heating chamber 12, an opening or aperture 62 may be provided in the outer wall 26 and an opening or aperture 64 oppositely disposed from the aperture 62 is provided in the inner wall 24. The opening may be in the form of irregularities in the walls to form means for permitting restrictive fluid flow.

In use, while the level of the water in the outer portions of the container 16 will surround the heating chamber 12, the insulating chamber 22 will provide an effective means for lowering the temperature of the water in the outer portions of the container 16. This is because the water exterior of the insulating chamber is maintained free of any substantial amount of heated water being received from the areas around the heating chamber 12, there being a substantially one way flow restriction provided by the rib 60 and the inner wall 24 with only the opening 62 and 64 permitting restricted flow.

In FIG. 2, there is shown a simplified variation which gives rise to the unexpected lowered temperature providing desired safety to the user. In lieu of the expensive heating chamber, a heat insulating assembly 70 is employed. This heat insulating assembly includes a cylindrical insulating upper wall 72 having an integral horizontal flange 74 which seats on the flange 18 and surrounds the heating chamber 12 though spaced therefrom. In lieu of ribs 60 the bottom 59 of the bowl 16 is provided with a plurality of hemispherical projections 76 integral with the bottom 59 of the bowl 16. The projections 76 serve to seat and accurately locate a ring 78 forming a lower wall of which the upper wall 72 telescopically seats forming a vertically extending wall which extends fully from the bottom 59 to the cap 10 thus reducing the heat of the water outwardly of the heat insulating assembly 70 to 35° C. under normal or to be reasonably expected conditions of use.

The ring 78 has suitable bores or openings 80, 82 suitably provided therein for permitting fluid flow from the exterior portions of the bowl to the space 84 about the heating assembly 12.

In FIG. 3 there is shown another form of the invention similar to FIG. 2 but wherein a ring 88 is telescopically associated with the upper wall 72 outwardly thereof. The ring 88, as shown in FIG. 4, may have any suitable bores or openings 90, 92 therein. The ring may be bonded, spin welded, or integrally molded with the bottom 59, or, if desired, projections similar to the projections 76 may be employed.

The embodiment of the invention shown in FIG. 5, is adapted for use in conjunction with a vaporizer of the type disclosed in United States Patent No. 3,518,409. This vaporizer employs a bowl 111 and has a cap 112, a heating chamber 114, and an outer wall or skirt 120. A ring 122 similar to the ring 88 is telescopically associated with the skirt 120 either inwardly or outwardly thereof and may be provided with any suitable restricted fluid flow openings 124, 126. Tests have shown that instead of operating temperatures in the neighborhood of 120° F. to 125° F. or more after extended use for the outer container water, the temperatures will be in the neighborhood of 35° C. or at human body temperature, a huge difference in safety entirely unexpected.

In FIG. 6 there is shown a much simplified embodiment in which a cylinder of plastic of suitable diameter so as to be well spaced from the heating chamber 12 and having openings (not shown) therein extends from the bottom 59 of the bowl 16 to the cap 10.

Referring now to the embodiment shown in FIG. 7 herein, reference numeral 220 generally designates an embodiment of steam vaporizer. The vaporizer includes a container 222 of a desired shape and which is preferably blow molded from linear polyethylene. A cap assembly 224 is provided and is formed from suitable insulative material, such as heat resistant Bakelite. A heating chamber assembly generally indicated at 226 is provided and preferably formed of suitable plastic material, such as a mineral filled phenolic. There is also provided an electrode assembly 228 which extends from the cap 224 into the heating chamber 226.

The heating chamber 226 is provided with an opening or openings 242 therein. The chamber 226 has an enlarged upper portion 245 and a restricted lower portion 247 interconnected by a horizontal wall 243. Also integral with the upper portion 245 and forming a continuation thereof is the inner wall 250 of an insulating chamber 252 which tapers downwardly and away from the lower section 247 to form a space 254 therebetween. The insulating chamber 250 is defined by a bottom wall 256 and a tapered outer wall 258 which terminates in an upper flange 260 secured to the cap assembly 224.

The container 222 is provided with a circular rib 223 which rises upwardly from the bottom of the container and is so arranged as to be closely spaced from the lower inner edge of the insulating chamber 252 so as to permit only minor and restricted flow of fluid from the exterior portions 268 of the container into the space 254. A second rib 223' may be provided which functions to reduce flow of fluid and to reduce leakage current by increasing the electrical path..

Thus, it can be seen that the water within the heating chamber 226, which is heated, may spurt out of the opening 242. However, this water will not pass readily into the outer reaches 268 of the container 222 because flow is restricted by the close positioning of the insulating chamber 252 with respect to the rib 223 which may abut the insulating chamber in some positions. The insulating chamber 252 further surrounds the heating chamber 226 and will prevent heat transfer to the outer reaches 268 of the container.

Figure 8:
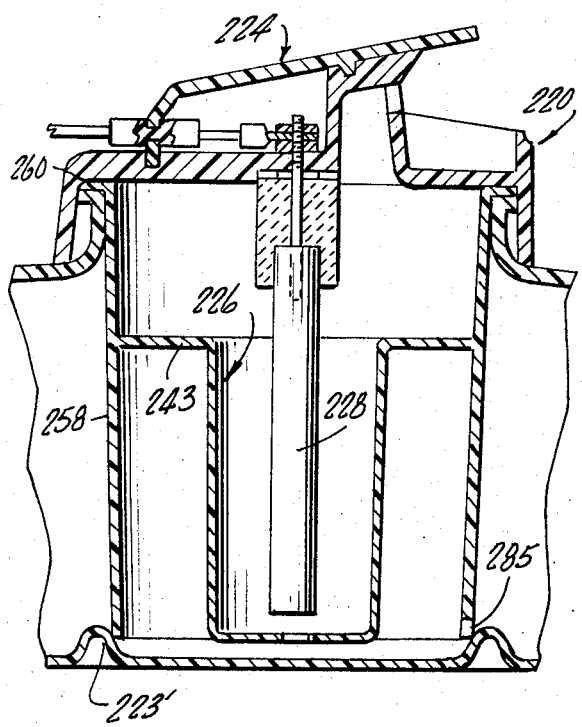
FIGS. 8 and 9 are vertical sectional views showing variations of the embodiment shown in FIG. 7.

In FIG. 8 there is shown a first modification of the embodiment of FIG. 7, wherein the horizontal wall 243 is an enlargement of the wall 243 of FIG. 7 and the inner wall 250 is entirely eliminated. The rib 223' is engaged by the wall 258 to restrict fluid flow. An opening or openings 285 may be provided in cylindrical wall 258.

Figure 9:
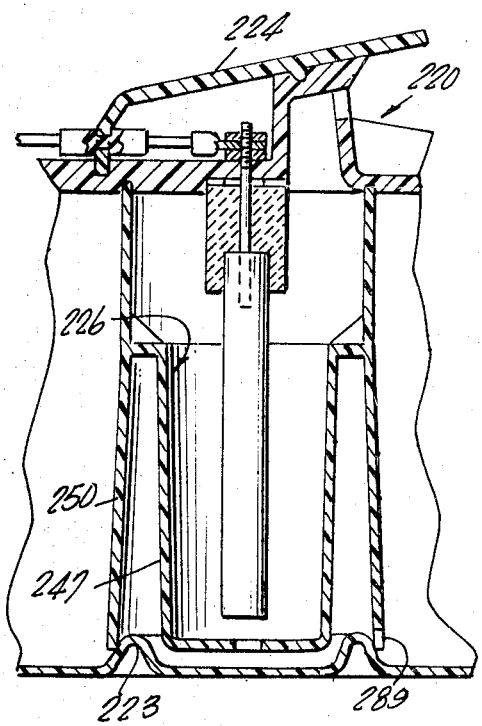

In the embodiment shown in FIG. 9 the outer wall is eliminated and the inner wall extends downwardly into engagement with the rib 223 of the bottom of the bowl. Openings 289 or the like can be provided for restricted fluid flow. Thus it can be seen that the provision of an insulating barrier of wall is achieved by providing a substantially cylindrical wall which extends from cap 224 to the bottom of the bowl.

Figure 10:
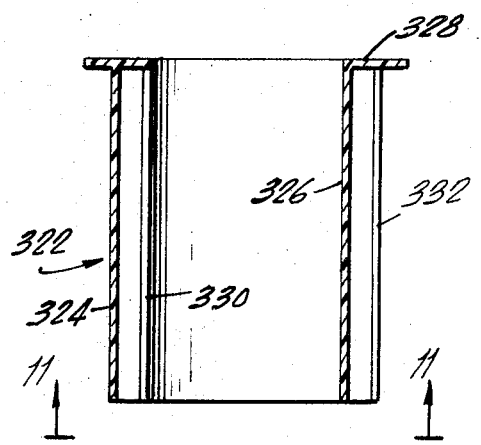
FIG. 10 is a vertical sectional view of a modified heat insulating chamber assembly.
Figure 11:
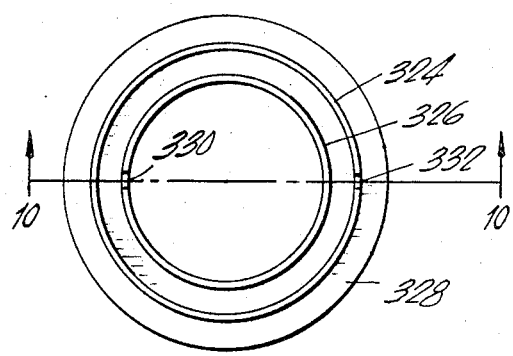
FIG. 11 is a bottom plan view of the construction shown in FIG. 10.

As shown in FIGS. 10 and 11 a modified form of insulating assembly 322 can be employed instead of the insulating assembly 22. In this form of the invention there is an inner wall 326 preferably cylindrical in shape. Spaced from the inner wall 326 is an outerwall 324 and integral with the inner and outer walls at the tops thereof is a flange 328. The inner wall 326 is provided with a narrow vertically extending slit 330 or opening therein and at a location 180 degrees opposite thereto the outer wall 324 is provided with a slit or opening 332 therein for permitting restricted fluid flow independent of the level of water in the bowl.

Figure 12:
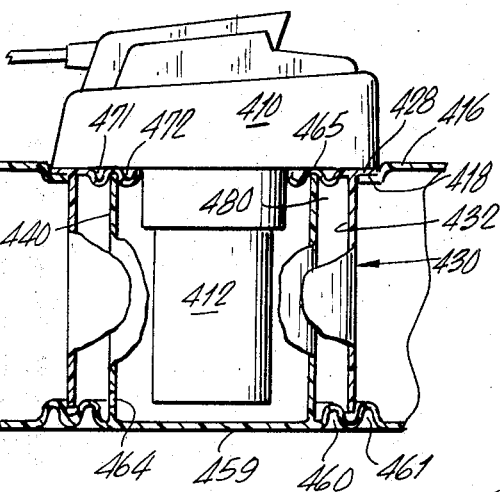
FIG. 12 is a vertical sectional view of yet another embodiment of the invention; and, FIG. 13 is a vertical sectional view of a vaporizer construction of still another form.

In the embodiment shown in FIG. 12, the bowl 416 is provided with a flange 418. The cap 410 and heating chamber 412 assembly seat and is supported on an outer insulating wall assembly 430 which includes a cylindrical outer wall 432 which has an integral flange 428 which seats on the flange 418 and on which the cap 410 rests. Of course, the flange 418 can be made part of the flange 428 and then secured on the bowl 416. The bowl 416 has its bottom 459 provided with a pair of circular ribs 460 and 461. The outer wall 432 extends downwardly between ribs 460 and 461 and extends below the tops of the ribs 460 and 461. Preferably integral with and rising from the bottom 459 is an inner insulating wall 440 spaced from the outer wall 432 and well spaced from the heating chamber 412. Integral with and forming an inner extension of the flange 428 is a ribbed portion 465 including a pair of ribs 471 and 472 of circular configuration into which the upper part of inner wall 440 is seated. The inner wall 440 may be provided with a suitable opening or openings 464 therein. Thus two insulating walls which extend from cap 410 to bottom 459 are provided defining an insulating chamber 480.

Figure 13:
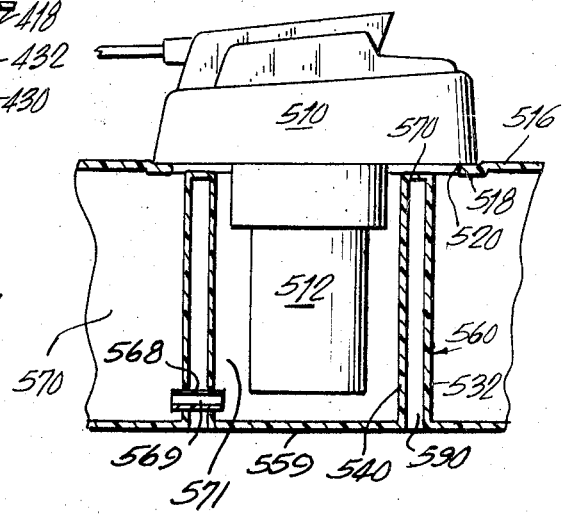

Referring now to FIG. 13, herein is shown a novel bowl construction for providing insulation. The bowl 516 has a flange 518 having its inner edge 520 defining a central opening for receiving the heating chamber 512 which depends from the cap assembly 510.

Integrally formed during molding of the bowl is a rib 560 having an inner wall 540 and an outer wall 532 which extends from the bottom 559 of the bowl 516 to the cap 510. The inner wall 540 and the outer wall 532 are interconnected by an upper interconnecting portion 570 on which the cap 510 may seat. The inner wall 540 and the outer wall 532 are provided with aligned openings in which a tube 568 is bonded forming a restricted fluid flow path 569 from the outer reaches 570 of the bowl 516 into the inner space 571 surrounding the heating chamber 512 and with a cooling insulating air space 590 surrounding the heating chamber 512.

A latitude of modification, substitution and change is intended in the foregoing disclosure and in some instances, some features of the invention will be employed without a corresponding use of other features.

What is claimed is:

1. A vaporizer heat insulating construction comprising in combination a vaporizer bowl having its bottom provided with at least one upstanding rib, a vaporizer head including a cap having a heating chamber depending therefrom, said heating chamber having heating means therein and an opening for receiving liquid from said vaporizer bowl, said vaporizer bowl having an opening for receiving said heating chamber, said opening being defined by a peripheral edge, a wall separate from and surrounding said heating chamber in non-contacting spaced relation thereto, said wall engaging said rib and extending from the bottom of said vaporizer bowl to said cap to divide the vaporizer bowl into an exterior portion and an interior portion, said wall having means therein for permitting restrictive fluid flow from said exterior portion of said bowl inwardly of said wall to said interior portion.

2. A vaporizer insulating construction according to claim 1, wherein said rib is circular and said wall is cylindrical.

3. A vaporizer insulating construction according to claim 1, wherein said rib surrounds the lower edge of said wall.

4. A vaporizer insulating construction according to claim 1, wherein said rib is inwardly of said wall and is surrounded thereby.

5. A vaporizer heat insulating construction according to claim 1 wherein said wall has integrally connected thereto a substantially horizontal flange portion overlying said bowl at said edge, an inner wall means integral with said bottom and spaced inwardly of said wall, at least one upper rib depending from said flange portion, said inner wall means engaging said upper rib and having means for permitting fluid flow inwardly of said inner wall means.

References Cited

UNITED STATES PATENTS

| | | | |
|---|---|---|---|
| 3,518,409 | 6/1970 | Corbett | 219—271 |
| 2,763,765 | 9/1956 | Duberstein et al. | 219—289 X |
| 3,637,978 | 1/1972 | Corbett et al. | 219—284 |
| 3,610,879 | 10/1971 | Katzman et al. | 219—284 X |
| 1,430,548 | 10/1922 | Hogue | 219—273 |
| 3,659,078 | 4/1972 | Rudstrom | 219—288 X |
| 3,584,193 | 6/1971 | Badertscher | 219—275 X |
| 2,533,794 | 12/1950 | Hanks et al. | 219—275 |
| 2,023,324 | 12/1935 | Johnson et al. | 219—275 X |
| 2,076,709 | 4/1937 | Deutsch | 219—271 X |
| 1,749,969 | 3/1930 | Brodin | 219—275 UX |

ANTHONY BARTIS, Primary Examiner

U.S. Cl. X.R.

21—119; 128—192; 219—272, 288, 314